US012540801B1

(12) United States Patent
Sanchez-Lohff et al.

(10) Patent No.: US 12,540,801 B1
(45) Date of Patent: Feb. 3, 2026

(54) DEFENSIVE SPRAY APPARATUS AND RELATED METHODS

(71) Applicant: Adrian Sanchez-Lohff, Chicago, IL (US)

(72) Inventors: Adrian Sanchez-Lohff, Chicago, IL (US); Kevin Stephens, Houston, TX (US)

(73) Assignee: Watch Yo Self, LLC, Chicago, IL (US)

( * ) Notice: Subject to any disclaimer, the term of this patent is extended or adjusted under 35 U.S.C. 154(b) by 170 days.

(21) Appl. No.: 18/485,011

(22) Filed: Oct. 11, 2023

Related U.S. Application Data

(60) Provisional application No. 63/414,980, filed on Oct. 11, 2022.

(51) Int. Cl.
*F41H 9/10* (2006.01)
*G04B 47/00* (2006.01)
*G04G 21/04* (2013.01)

(52) U.S. Cl.
CPC ............... *F41H 9/10* (2013.01); *G04B 47/00* (2013.01); *G04G 21/04* (2013.01)

(58) Field of Classification Search
CPC ...... A61L 2/0088; A61L 2/26; A61L 2202/15; A61L 2202/16; A44C 5/18; A45F 5/00; A45F 2005/008; A47K 5/1201; A47K 5/1211; F41H 9/10; G04B 47/00; G04G 21/04
See application file for complete search history.

(56) References Cited

U.S. PATENT DOCUMENTS

| | | | | |
|---|---|---|---|---|
| 5,088,624 | A * | 2/1992 | Hackett | B65D 83/386 222/509 |
| 5,924,601 | A * | 7/1999 | Chen | F41H 9/10 222/78 |
| 7,316,332 | B2 * | 1/2008 | Powers | A61M 35/003 222/491 |
| 9,002,317 | B2 * | 4/2015 | Hymowitz | H04M 11/04 455/404.1 |
| 9,347,749 | B2 * | 5/2016 | Olah | F41H 9/10 |
| 10,264,859 | B2 * | 4/2019 | Parker | B05B 11/0054 |
| 10,996,028 | B2 * | 5/2021 | Jimenez | B05B 11/10 |
| 11,096,528 | B2 * | 8/2021 | Chacon, Jr. | A44C 5/0007 |
| 11,490,852 | B1 * | 11/2022 | Kurani | A61B 5/748 |
| 11,717,063 | B1 * | 8/2023 | Demirjian | B05B 11/0038 222/175 |
| 11,819,871 | B2 * | 11/2023 | Andrinal Lopez | A44C 5/0007 |
| 12,285,084 | B1 * | 4/2025 | Demirjian | B05B 11/00442 |
| 2004/0162534 | A1 * | 8/2004 | Powers | A47K 5/122 604/310 |
| 2006/0219742 | A1 * | 10/2006 | Chen | A45D 33/33 224/267 |

(Continued)

*Primary Examiner* — Vishal Pancholi
(74) *Attorney, Agent, or Firm* — James E. Walton

(57) ABSTRACT

A defensive spray apparatus includes a casing, a canister comprising an inner chamber received at least partially within the casing, and a watch device with at least one wrist band coupled to the watch device. The casing includes at least one nozzle to spray the defensive fluid, at least one canister release button with a ledge to secure canister within the casing, at least one trigger on either side of the casing, and a communication subsystem connecting the apparatus to the watch device.

20 Claims, 14 Drawing Sheets

(56) References Cited

U.S. PATENT DOCUMENTS

| | | | | |
|---|---|---|---|---|
| 2008/0230560 | A1* | 9/2008 | Powers | A45D 34/00<br>264/250 |
| 2011/0155765 | A1* | 6/2011 | Properzi | A47K 5/1201<br>222/401 |
| 2015/0158042 | A1* | 6/2015 | Parker | A44C 15/005<br>222/183 |
| 2016/0044997 | A1* | 2/2016 | Horgan | A61M 35/003<br>222/175 |
| 2017/0122708 | A1* | 5/2017 | Gorinas | A44C 9/0061 |
| 2017/0156454 | A1* | 6/2017 | Abadi | A44C 5/0053 |
| 2017/0340852 | A1* | 11/2017 | Deitrickson | A62B 23/00 |
| 2020/0245822 | A1* | 8/2020 | Chacon, Jr. | G04G 17/08 |
| 2022/0233028 | A1* | 7/2022 | Shaukat | A47K 5/1217 |

* cited by examiner

DEFENSIVE SPRAY APPARATUS AND RELATED METHODS

This application claims the benefit of U.S. Provisional Application No. 63/414,980, filed 11 Oct. 2022, titled "Defensive Spray Apparatus and Related Methods," which is incorporated herein for all purposes.

BACKGROUND

1. Field of the Invention

The present application relates generally to defensive spray apparatuses and related methods, and more specifically to a defensive spray apparatus that is user-wearable.

2. Description of Related Art

It is common for individuals to carry some form of self-defense while they are in public. One of the more common items for self-defense that individuals will carry with them are defensive sprays such as pepper spray. While these sprays are useful, defensive spray devices can be bulky, heavy, and difficult to transport. For example, it can be difficult to exercise (such as by running or jogging) while carrying a defensive spray device. Moreover, it can take time to retrieve the device when a user determines that it is time to deploy the pepper spray. These factors can create situations where an individual may be unable to use their defensive spray fast enough if they were in danger.

Current improvements to these issues have led to such improvements as making spray devices small enough to fit on a key ring for easy use or having a dedicated space in bags or purses for storage and quick retrieval. However, there is still a need for further improvement on defensive sprays to facilitate ease of transportation, quick and easy access for deployment, and efficient operation of the device. While many improvements have been made to this field over the years, there is still room to improve.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
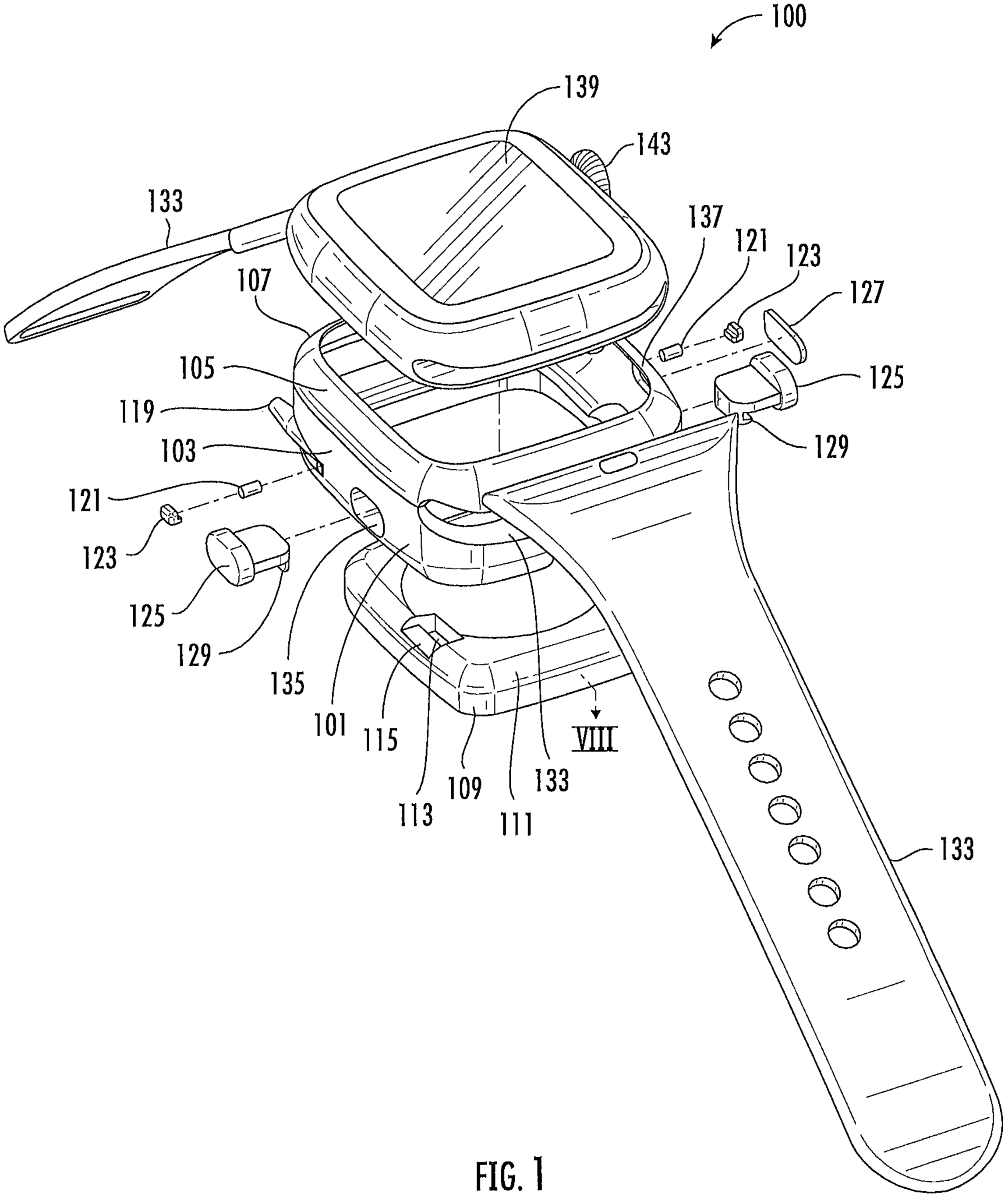
FIG. 1 is a perspective exploded view of the left side of defensive spray apparatus, according to one embodiment.

While the assembly and method of the present application is susceptible to various modifications and alternative forms, specific embodiments thereof have been shown by way of example in the drawings and are herein described in detail. It should be understood, however, that the description herein of specific embodiments is not intended to limit the present application to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the defensive spray apparatus and related methods according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, an exploded view of defensive spray apparatus 100 according to the preferred embodiment of the present application is depicted. In the preferred embodiment, defensive spray apparatus 100 is user-wearable. Defensive spray apparatus 100 is comprised of a casing 101, first casing segment 103, second casing segment 105, chamfered casing edges 107, canister 109, chamfered canister edges 111, recess 113, shoulder 115, nozzle 119, trigger 121, trigger cover 123, canister release button 125, button extension 127, ledge 129, watch band 131, wall opening 133, canister release button opening 135, button extension opening 137, watch device 139, and electronic device knob 143. Casing 101 houses the entirety of spray apparatus 100 and is a continuous piece formed by first segment 103 and second segment 105. However, an alternative embodiment could exist where instead of first casing 103 and second casing 105 being built as one continuous piece such as in the present application, first casing 103 and second casing 105 could be separate pieces that can come apart and then attach back together to form casing 101. First casing segment 103 is formed out of a firm material to act as a secure base while second casing segment 105 is formed out of flexible material. Since second casing segment 105 is made from flexible material, watch device 139 can be inserted into casing 101 by pushing watch device 139 past second segment 105. Once watch device 139 is past segment 105, segment 105 will spring back into place holding device 139 within casing 101. Watch device 139 can be removed from casing 101 by the user providing a strong enough force to move back second segment 105 to extract watch device 139. It is appreciated that while in the present embodiment a watch device 139 is used with spray apparatus 100, other electronic devices such as phones, media players, pagers, body cameras, tablets, and any other portable electronic device can be used with spray apparatus 100.

Casing 101 further has chamfered edges 107 along the sides of both first casing segment 103 and second casing segment 105. Chamfered edges 107 are used to remove any sharp edges on casing 101 that would be in contact with the individual wearing spray apparatus 100. This modification improves the comfort of the individual wearing spray apparatus 100. Chamfered edges 107 on second casing segment 105 also works as a lip covering the top of watch device 139 to hold watch 139 in place when inserted into casing 101.

Also housed within casing 101 is canister 109 which stores the defensive fluid, such as pepper spray, oleoresin capsicum, animal repellant spray, or any other defensive fluid that the individual would use for self-defense. It is appreciated that alternative embodiments exist where canister 103 is an integral piece of casing 101 and is not removable from spray apparatus 100. Canister 109 also has chamfered edges 111 to improve the comfort of an individual wearing spray apparatus 100. On the left and right sides of canister 109, a part of the material is removed to create recess 113 and shoulder 115. Recess 113 is a divot beyond shoulder 115 where ledge 129 of release button 125 can latch onto. First casing segment 103 has a bottom opening that is sized such that canister 109 can be inserted into first segment 103 from below and when inserted, there will be no room for canister 109 to move from side to side. When canister 109 is inserted into first segment 103, the ledge 129 portion of release button 125 is inserted into segment 103 through canister release button opening 135 and ledge 129 latches onto recess 113 to secure canister 109 within casing 101. When an individual wants to remove canister 109, the individual will need to press down on both release buttons 125 found on either side of casing 101 to remove canister 109. The pressure of pushing on release buttons 125 moves ledge 129 up and away from recess 113 so that release buttons 125 can be pulled out of casing 101 which will allow a user to remove canister 109 from casing 101. Shoulder 115 and recess 113 are sized to have similar dimensions as ledge 129 so that when ledge 129 is inserted over shoulder 115 and is latched to recess 113, ledge 129 will securely fit within that space without much leeway for movement. When the defensive fluid within canister 109 has been emptied, the user will remove canister 109 from casing 101 and may then either refill canister 109 or replace the empty canister 109 with a canister 109 that is full of defensive fluid.

Attached on the front end of first casing segment 103 are nozzles 119 which are used to spray the contents of cannister 109. The current embodiment has spray apparatus 100 utilizing two nozzles 119, however, it is appreciated that alternative embodiments can exist where spray apparatus 100 uses less than two or more than two nozzles 119. It is also appreciated that while the location of nozzles 119 in the current embodiment is at the front of spray apparatus 100, alternative embodiments can exist wherein nozzles 119 are located on any side of spray apparatus 100. Defensive spray apparatus 100 further includes triggers 121 on each side of casing 101 and trigger cover 123 covering both triggers 121. When both triggers covers 123 are simultaneously pressed by the user, trigger covers 123 will press down triggers 121 and the defensive fluid (such as the pepper spray) will be sprayed at a target through nozzles 119. Nozzles 119 are partial cone shaped where the radius of nozzle 119 decreases from casing to the opening which increase the velocity of the defensive fluid leaving nozzle 119, but since nozzle 119 is a partial cone, the exit radius of nozzle 119 is still large enough to allow defensive spray to exit over larger area. When triggers 121 are pressed down, triggers 121 act as levers pushing on and opening nozzle 119 to release the pressurized defensive fluid within canister 109. Trigger covers 123 provide a raised surface on the side of casing 101 for an individual to press while also shielding the inner workings of triggers 121 connection to nozzle 119. If debris or other outside materials were to get into the inner mechanisms connecting triggers 121 and nozzles 119, the debris could disrupt operation of spray apparatus 100 and an individual might be unable to defend themselves using spray apparatus 100.

On both the front and back sides of casing 101 there are wall openings 133 which allow watch band 131 to be inserted into casing 101. Most watch devices 139 are designed where watch bands 131 can be detached and when detached, watch device 139 can be inserted into casing 101. When watch device 139 is inserted inside of casing 101, watch bands 131 can then be inserted through wall openings 133 in the front and back sides of casing 101 and attached into the corresponding place in watch device 139 to make watch 139 user-wearable. The sizing of openings 133 are designed such that when watch bands 131 are inserted into casing 101, bands 131 will not have substantial leeway while in opening 133 so that bands 131 will not move when inserted in casing 101 and thus spray apparatus 100 will stay firm on an individual's wrist. It is also appreciated that instead of removing watch bands 131 from watch device 139, an individual can insert watch device 139 into casing when watch bands 131 are still attached. In that method, a user will insert watch bands 131 first and slide bands 131 through openings 133 before inserting the rest of watch device 139.

Casing 101 further has other openings where more parts of spray apparatus 100 can be inserted. On both sides of spray apparatus 100 there are canister release button openings 135 in first segment 103 which are sized to fit release buttons 125 to secure buttons 125 in place within casing 101 after buttons 125 latch onto recess 113 in canister 109. Another opening within casing 101 is button extension opening 137 which is located on the right side of spray apparatus 100, with a center point where both first segment 103 and second segment 105 connect. Button extension opening 137 is used for a side button on watch device 139 so that the side button can still be used while device 139 is in casing 101. Button extension 127 covers opening 137 while also working as an extension of the side button on watch device 139 while inserted within casing 101 so that when an individual presses down on extension 127, the side button of watch device 139 is also pressed down. Extension 127 covers the inside of casing 101 to prevent debris and other outside material from entering casing 101 while an individual is wearing spray apparatus 100.

Figure 2:
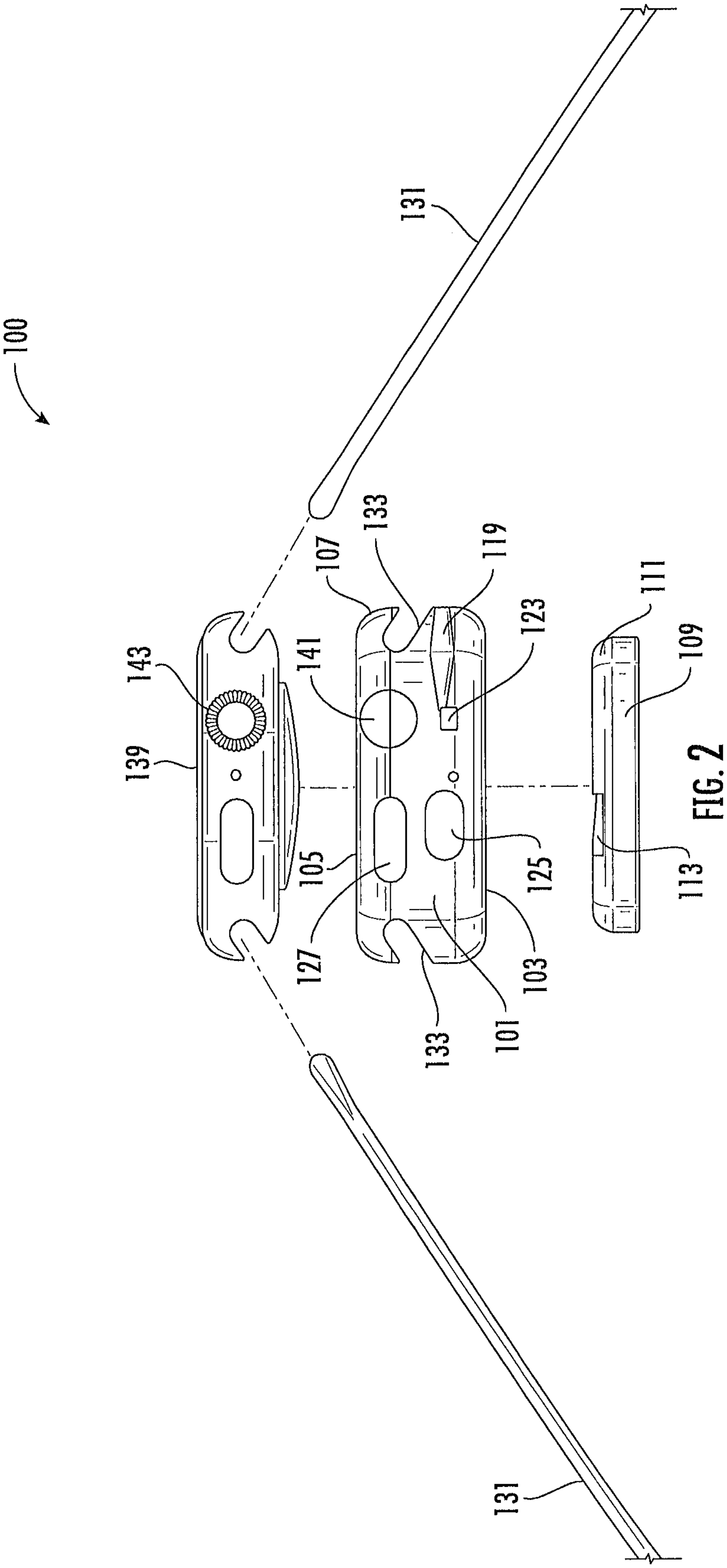
FIG. 2 is a side exploded view of the right side of defensive spray apparatus shown in FIG. 1.
Figure 3:
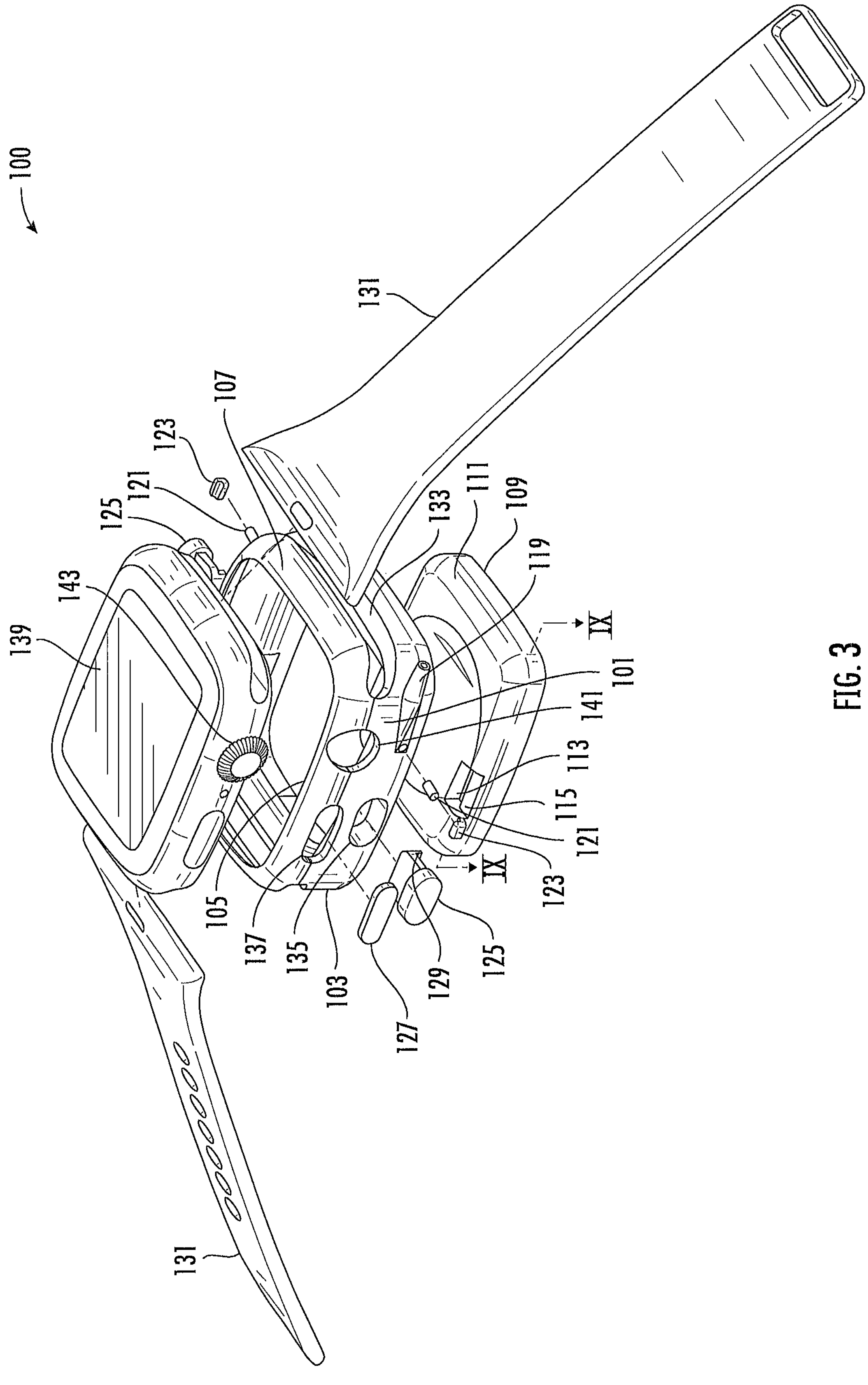
FIG. 3 is a perspective exploded view of the right side of defensive spray apparatus shown in FIG. 1.
Figure 4:
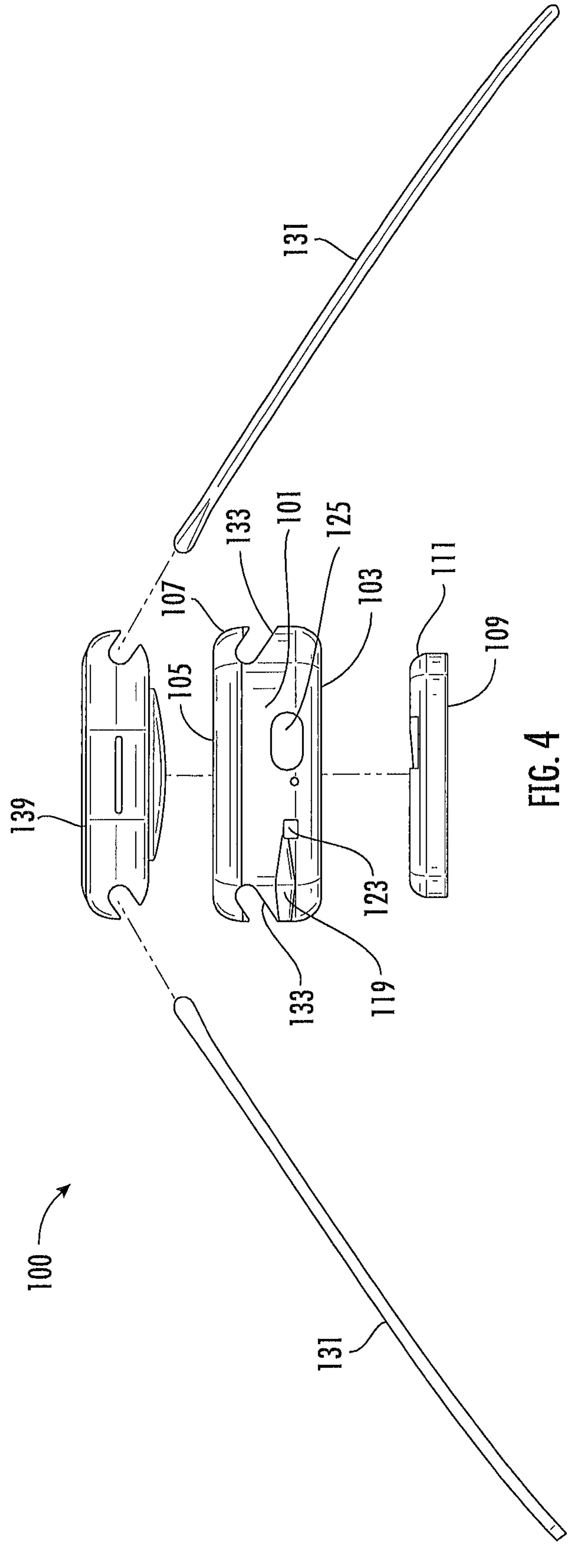
FIG. 4 is a side exploded view of the left side of defensive spray apparatus shown in FIG. 1.

Referring now to FIGS. 2 through 4 in the drawings, alternating side views of defensive spray apparatus 100 according to the present application are displayed. These figures provide a further look at parts of spray apparatus 100 described above while also including a view of watch device opening 141. Watch device opening 141 is on the right side of spray apparatus 100 and is a circular opening located with openings 141 center point being where first segment 103 and second segment 105 connect. When watch device 139 is inserted into casing 101, the time knob 143 used for adjusting the time on watch device 139 is inserted into opening 141 and extends out past casing 101 so that a user will still be able to adjust the time on watch 139 while watch 139 is in casing 101. Opening 141 is sized to be large enough to accommodate most watch time knobs 143 while also not being too large to limit movement of watch 139 while inside of casing 101.

Figure 5:
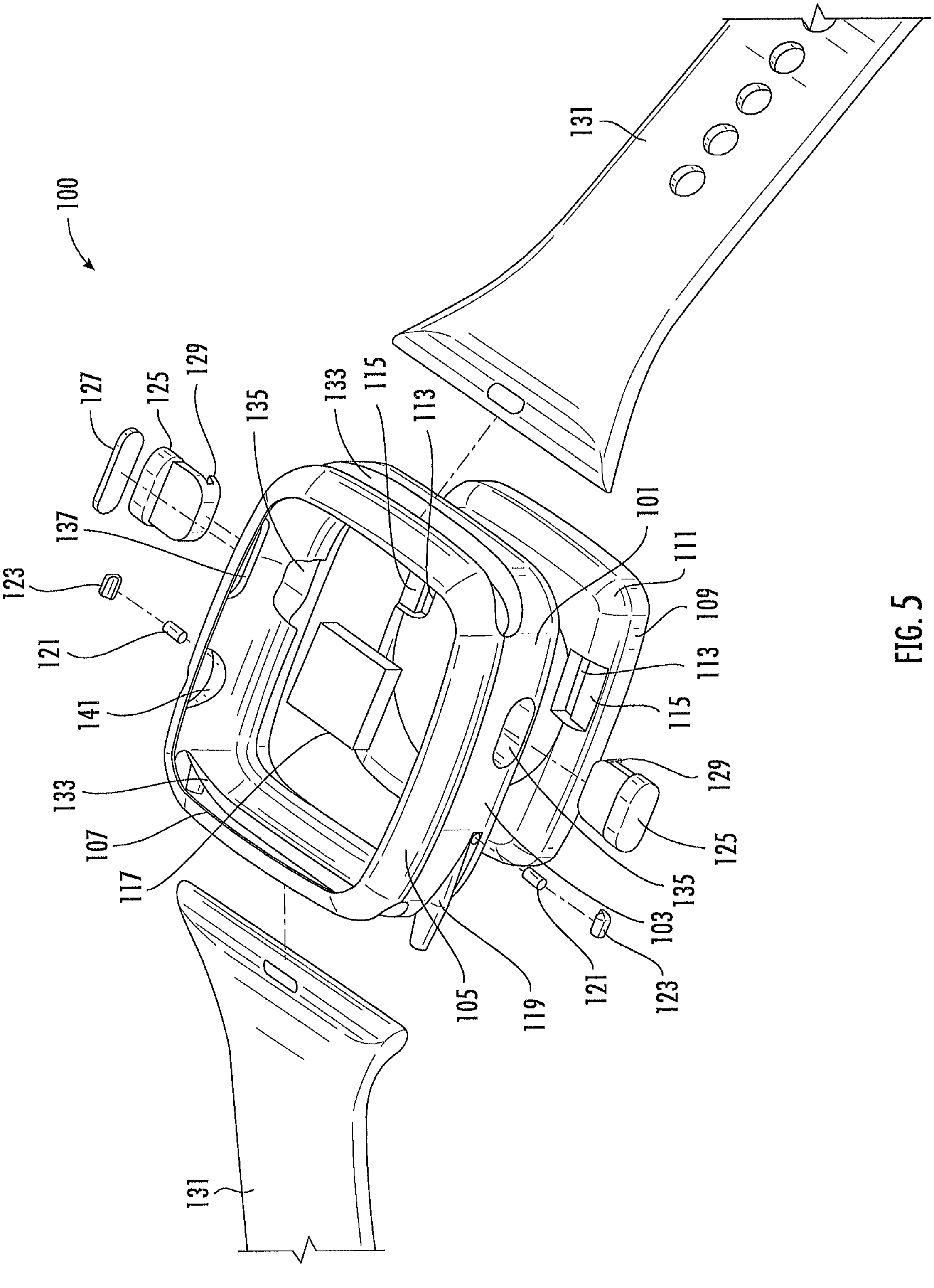
FIG. 5 is a perspective exploded view of the left side of defensive spray apparatus shown in FIG. 1, without the watch device shown.
Figure 6:
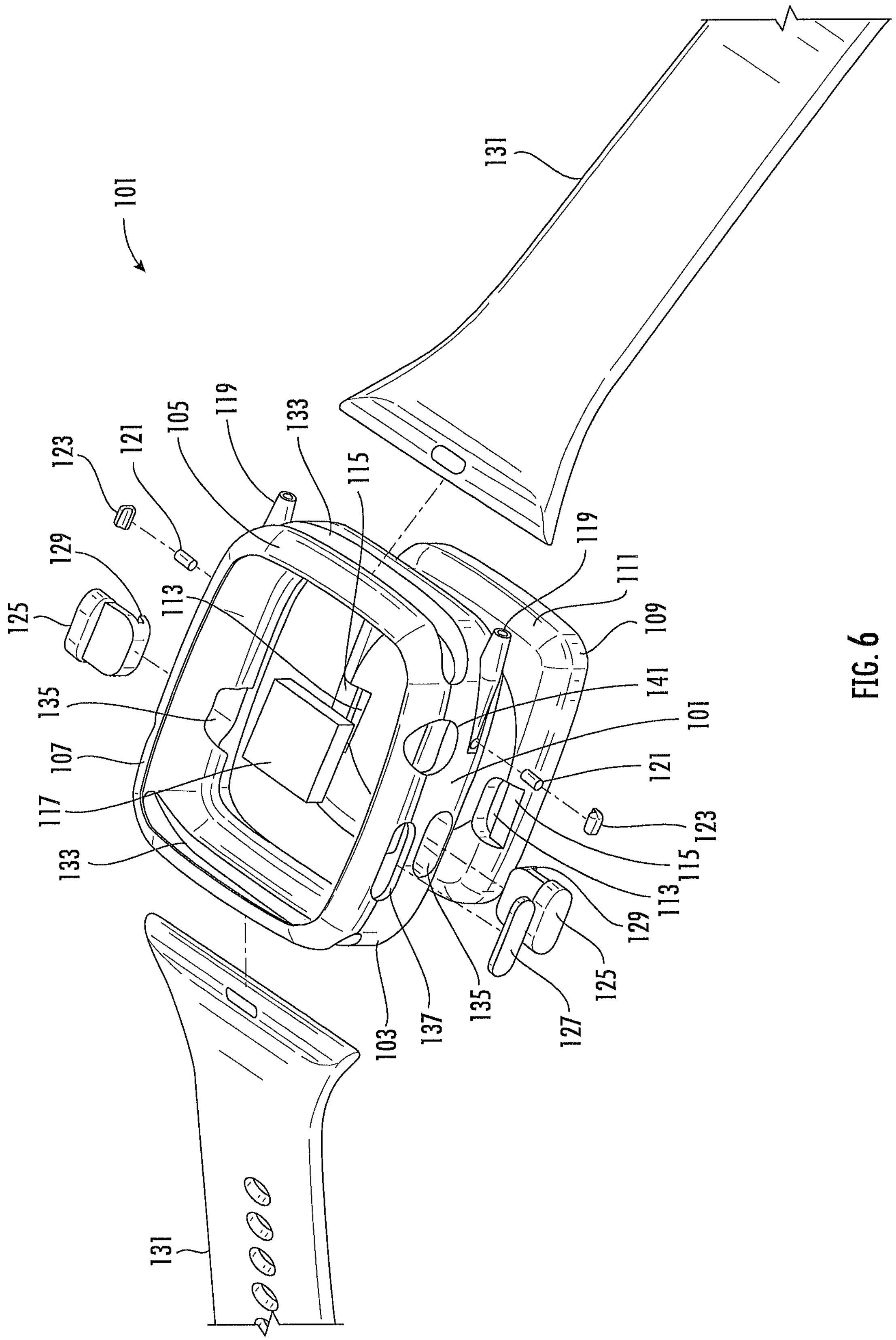
FIG. 6 is a side exploded view of the right side of defensive spray apparatus shown in FIG. 1, without the watch device shown.

Referring now to FIGS. 5 and 6 in the drawings, defensive spray apparatus 100 according to the present application without watch device 139 is shown. FIGS. 5 and 6 further provide a view of communication subsystem 117 stored within casing 101. Communication subsystem 117 includes, but is not limited to, parts such as circuit boards, electronic wiring, processors, ROM, voltage regulators, diodes, capacitors, resistors, transmitter circuits, audio circuit, an antenna, blue tooth receiver, and a wired receiver. Communication subsystem 117 connects watch device 139 to the rest of spray apparatus 100 so that spray apparatus 100 can use the features found within watch devices 139, such as being able to call the police, take photos, etc. when spray apparatus 100 is used. Communication device 117 will connect with watch device 139 either over Bluetooth or communication device 117 will be directly plugged into watch device 139.

Figure 7:
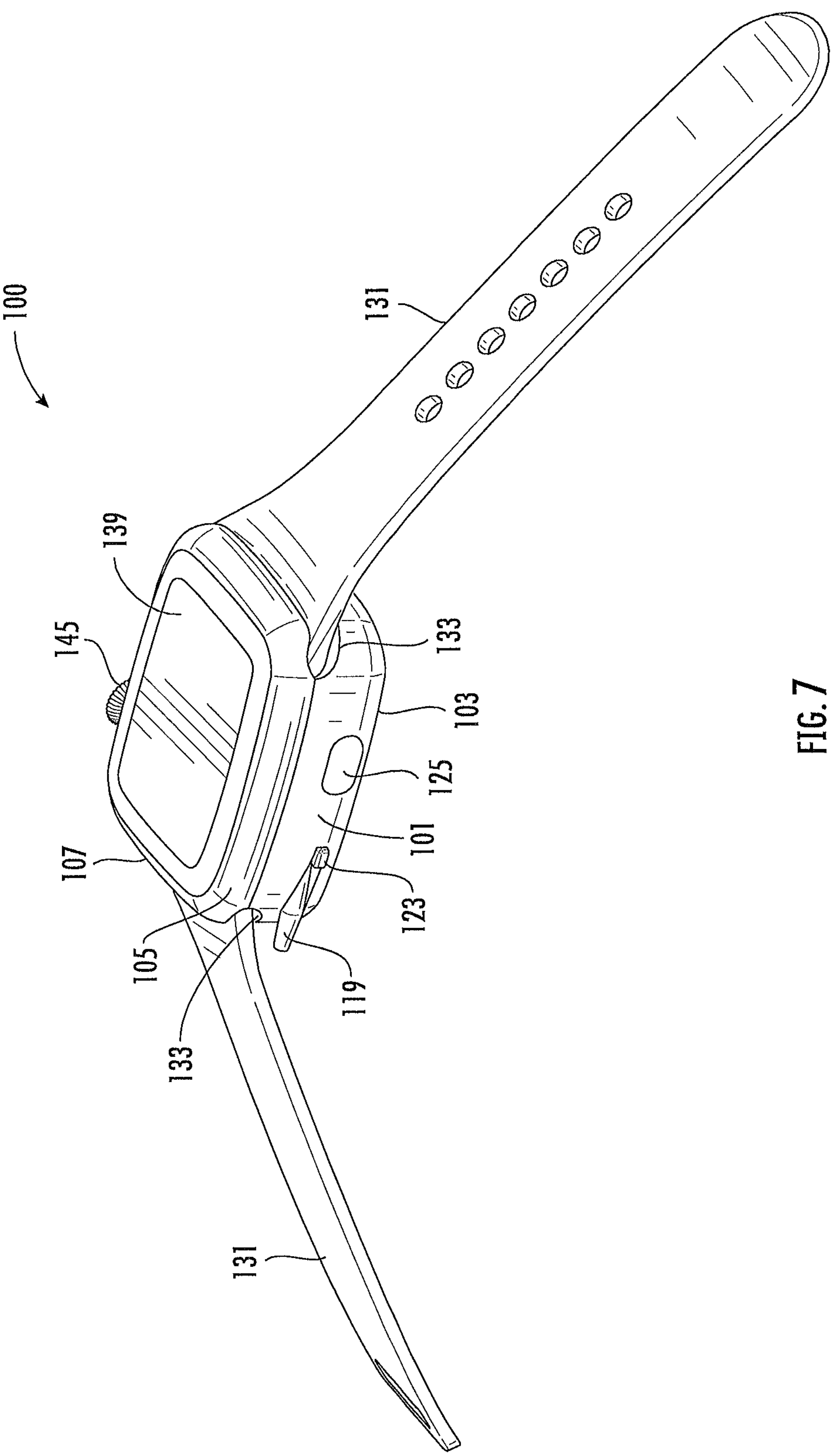
FIG. 7 is a perspective assembled view of the left side of defensive spray apparatus shown in FIG. 1.
Figure 21:
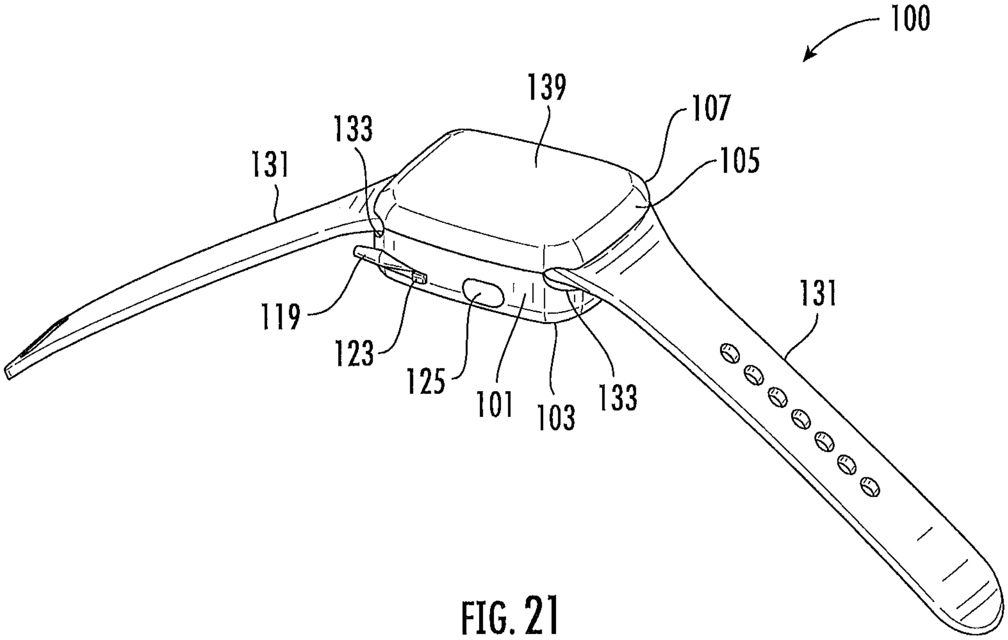
FIG. 21 is a perspective assembled view of the left side of defensive spray apparatus shown in FIG. 1.

Referring now to FIGS. 7 and 21 in the drawings, defensive spray apparatus 100 according to the present application is displayed. FIGS. 7 and 21 provide a clear view of spray apparatus 100 when every part is fully installed and spray apparatus 100 is ready to be worn. In this state, spray apparatus 100 is no bulkier than any other watch that an individual would wear. Defensive spray apparatus 100 also offers the user an efficient and easy way to aim at the individual threatening the user so that the user can act in self-defense.

Figure 8:
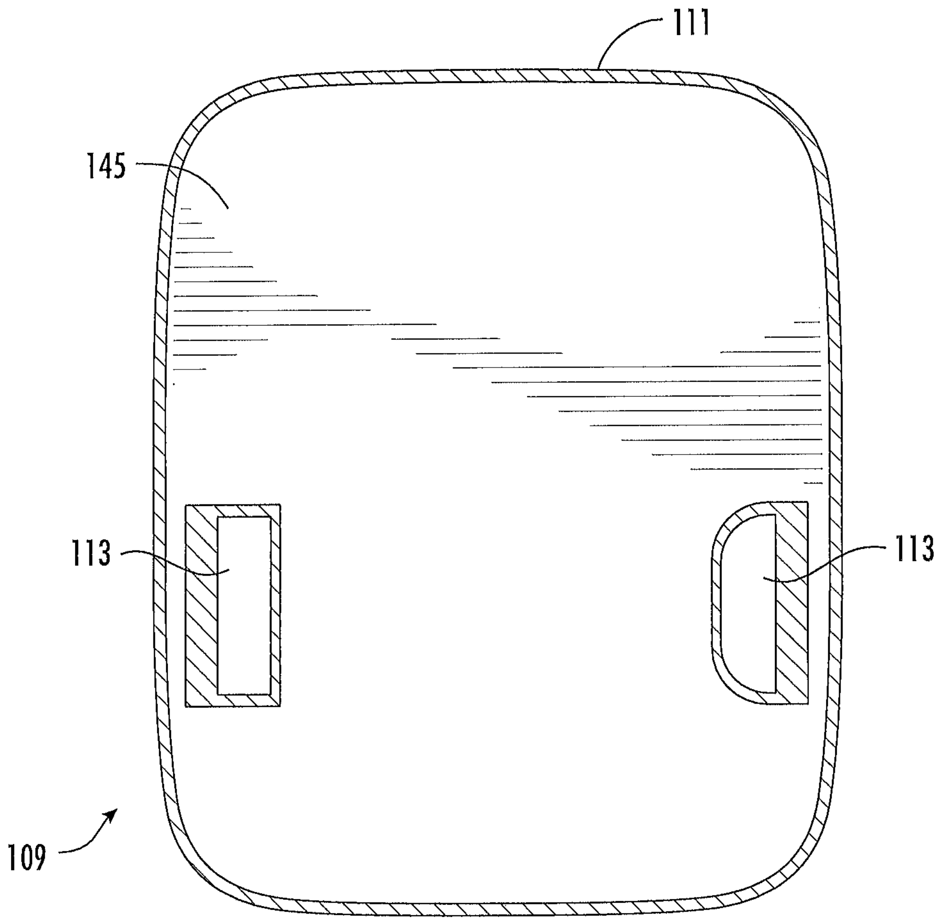
FIG. 8 is a cross-sectional view of the canister shown in FIGS. 1-7, along Section VIII-VIII shown in FIG. 1.
Figure 9:
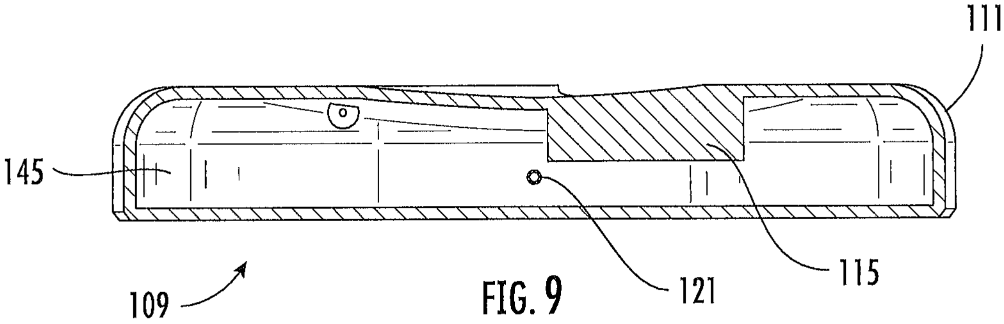
FIG. 9 is a cross-sectional view of canister shown in FIGS. 1-7, along Section IX-IX shown in FIG. 3.

Referring now to FIGS. 8 and 9 in the drawings, cross-sectional views of canister 109 according to the preferred embodiment are displayed. FIG. 8 is a cross-sectional view of canister 109 from cross section VIII-VIII found in FIG. 1, while FIG. 9 is a cross-sectional view of canister 109 from cross section IX-IX in FIG. 3. Both figures depict inner chamber 145 where defensive spray will be stored within spray apparatus 100. Inner chamber 145 is sealed off to pressurize the defensive spray so that spray shoots out of nozzles 119 at a high enough velocity to reach the intended target. These figures also provide another view of the depth of recess 115 to highlight how far down into canister recess 115 goes.

Figure 10A:
FIG. 10A is a front view of an individual wearing defensive spray apparatus as shown in FIG. 1.
Figure 10B:
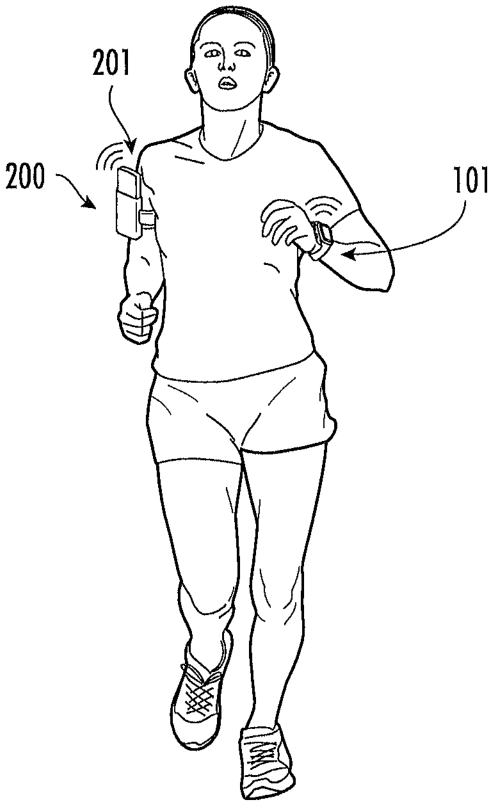
FIG. 10B is a front view of an individual wearing an alternative embodiment of defensive spray apparatus.

Referring now to FIGS. 10A and 10B in the drawings, defensive spray apparatus 100 according to the preferred embodiment and defensive spray apparatus 200 according to an alternative embodiment are depicted. FIG. 10A shows an individual wearing spray apparatus 100 while the user is exercising. FIG. 10B also shows an individual exercising but the individual is wearing an alternative embodiment spray apparatus 200. Defensive spray apparatus 200 is larger than the preferred embodiment of spray apparatus 100 and sized to accommodate cellular devices 201. Since spray apparatus 200 is designed to accommodate larger electronics such as phones 201, spray apparatus 200 is shown in FIG. 10B being wrapped around the forearm of the individual as a user wearing apparatus 200 around their wrist may be bulky and unwieldy. An individual wearing spray apparatus 200 in this manner will still be able to operate spray apparatus 200 in a similar way that the individual would operate apparatus 100.

Figure 11:
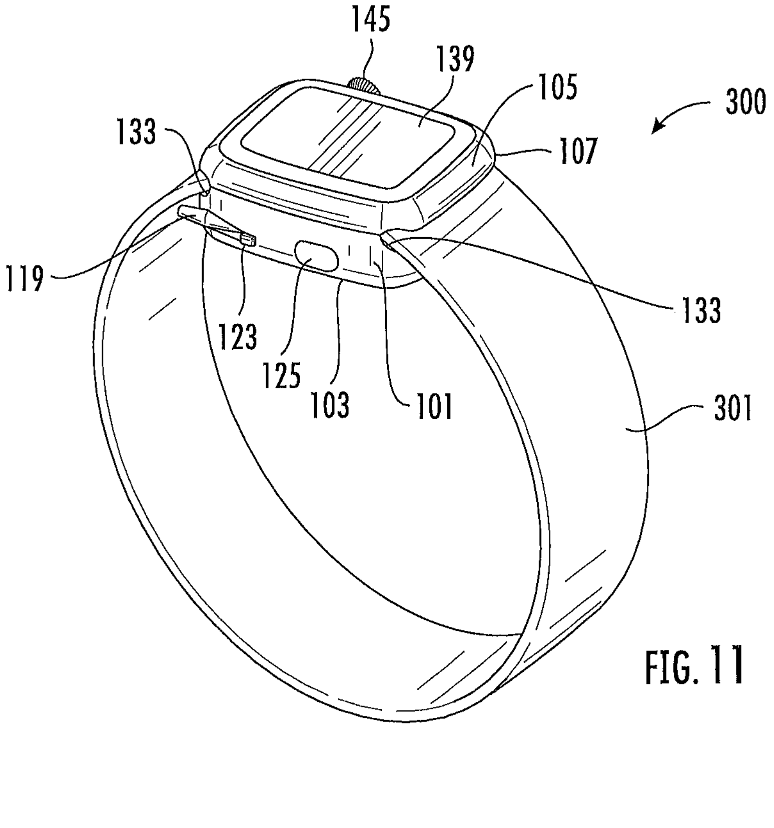
FIG. 11 is a perspective assembled view of the left side of an alternative embodiment of defensive spray apparatus.

Referring now to FIG. 11 in the drawings, defensive spray apparatus 300 according to an alternative embodiment of the present application is depicted. Defensive spray apparatus 300 differs from the main embodiment of spray apparatus 100 in that watch band 301 is a singular piece of stretchable material instead of being comprised of two pieces of non-stretchable material found in apparatus 100. Watch band 301 being stretchable extends the range of use for apparatus 300 by allowing an individual to put apparatus 300 on any limb that may be bigger than their wrist. This allows an individual to place apparatus 300 on their leg or further up on their arm while running. Beyond watch band 301, spray apparatus 300 functions the same and has the same structure as spray apparatus 100.

Figure 12:
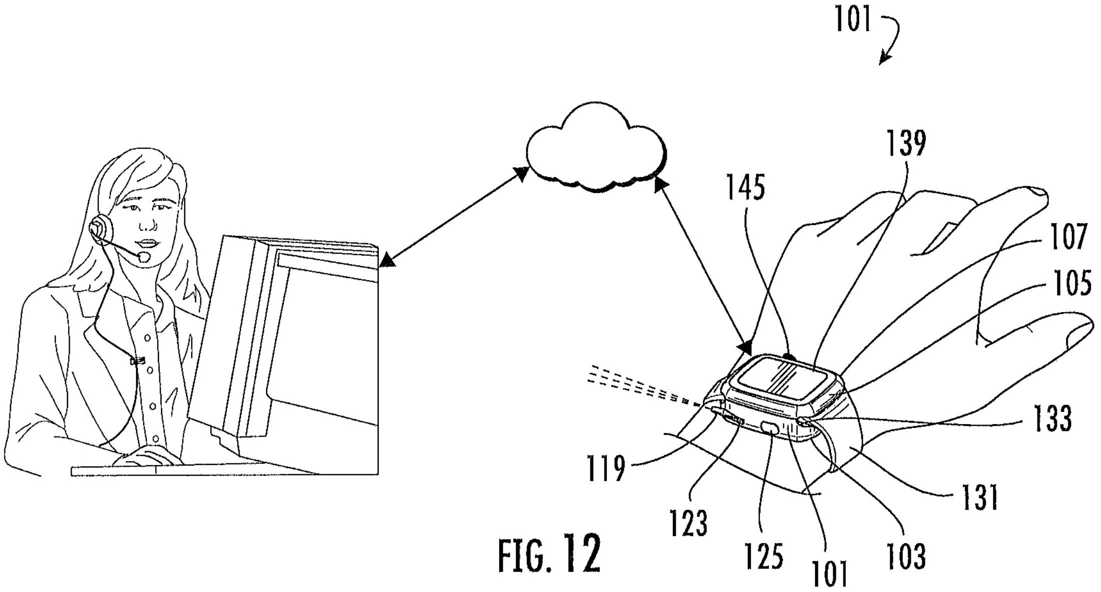
FIG. 12 is a perspective view of an individual wearing defensive spray apparatus as shown in FIG. 1.
Figure 13:
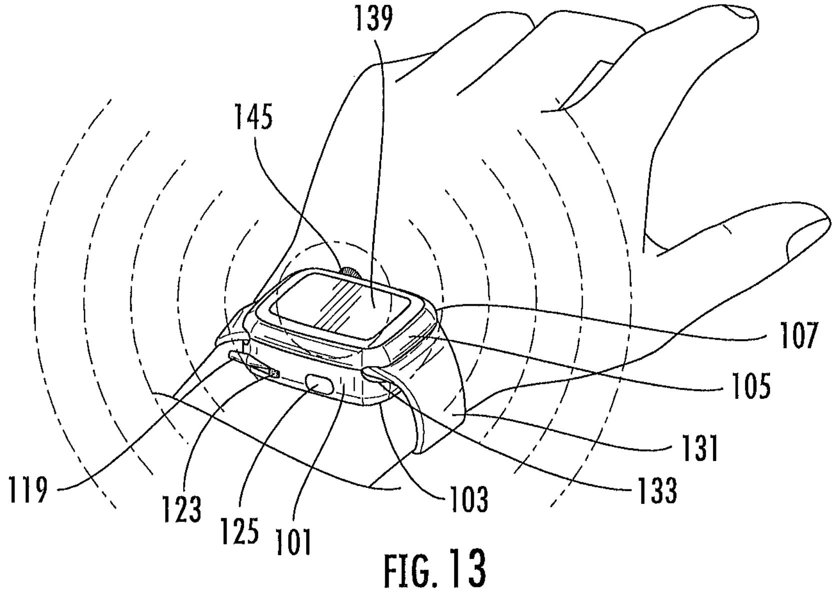
FIG. 13 is a perspective view of an individual wearing defensive spray apparatus as shown in FIG. 1.

Referring now to FIGS. 12 and 13 in the drawings, defensive spray apparatus 100 according to the preferred embodiment of the present application is depicted. FIGS. 12 and 13 depict different ways that spray apparatus 100 connects with and uses the features of watch device 139 through communication subsystem 117. FIG. 12 depicts one usage where an individual pressing down on both trigger covers 123 to discharge fluid from nozzles 119 also triggers communication subsystem 117 connected with watch device 139 to call the police. This allows help to arrive at the scene significantly sooner which helps the individual if the danger is still present. FIG. 13 highlights another way spray apparatus 100 connects with watch device 139 where communication subsystem 117 triggers an audible alarm when spray apparatus 100 is triggered. Triggering the alarm feature of watch device 139 sets off a loud alarm that alerts nearby individuals that the user of spray apparatus 100 needs assistance. These features may be activated or deactivated depending on when the user wishes to utilize the features by using communication subsystem 117.

Figure 14:
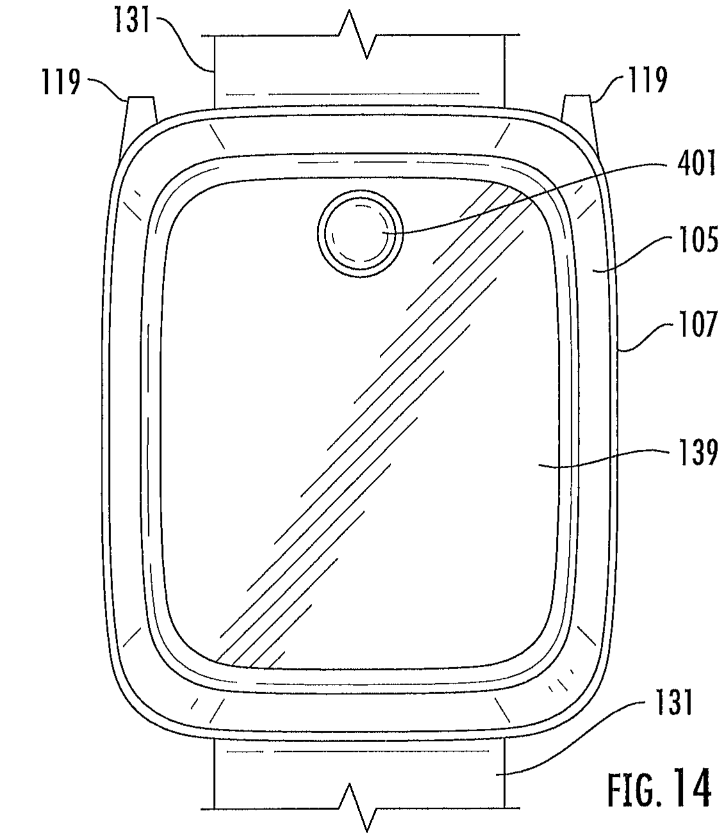
FIG. 14 is a top view of the watch device in defensive spray apparatus as shown in FIG. 1.

Referring now to FIGS. 14-17 and 20 in the drawings, other ways that communication device 117 connects defensive spray apparatus 100 with watch device 139 are depicted. One way that communication device 117 utilizes the functions of watch 139 is to activate the camera of watch 139 when spray apparatus 100 is used. FIG. 14 depicts watch device 139 with camera indicator 401 on the face of watch 139. Camera indicator 401 signals to the user that when the user presses down on trigger covers 123 to activate spray apparatus, the camera of watch device 139 will also be activated. The camera of watch 139 will then capture a photo of the individual being targeted by spray apparatus 100. This feature can be activated and deactivated by the user operating communication device 117 and indicator 401 will inform the user when the feature is active.

Figure 15:
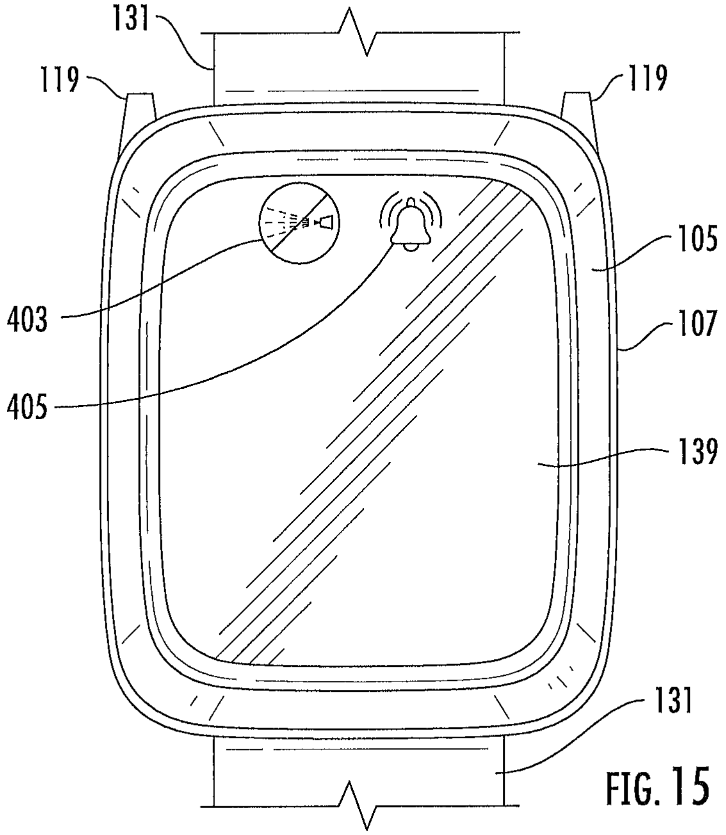
FIG. 15 is a top view of the watch device in defensive spray apparatus as shown in FIG. 1.

FIG. 15 depicts another way communication device 117 can connect with watch 139 and shows no-spray indicator 403 and alarm indicator 405 on the face of watch device 139.

No-spray indicator 403 and alarm indicator 405 show settings that a user can set on communication device 117 that will affect the operation of spray apparatus 100. When no-spray indicator 403 and alarm indicator 405 are present on the face of watch device 139, the user has set up communication device 117 where spray apparatus 100 will not spray defensive fluid when trigger covers 123 are pressed. In this mode, when the user presses down on trigger covers 123, the alarm function of watch device 139 will activate and no fluid will spray out of nozzles 119. The user can use communication device 117 to either activate or deactivate these features. The user can also use communication device 117 to only activate one of these features if the user does not wish to activate both.

Figure 16:
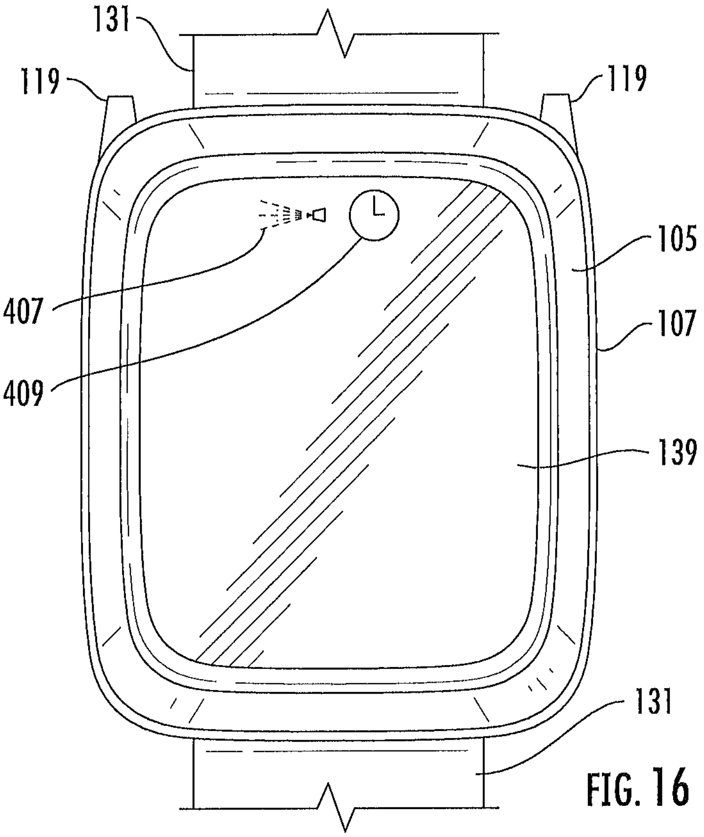
FIG. 16 is a top view of the watch device in defensive spray apparatus as shown in FIG. 1.

FIG. 16 provides another alternative mode of use for defensive spray apparatus 100 where the spray from nozzles 119 can be delayed on a timer. The face of watch 139 in FIG. 16 shows spray indicator 407 and delay indicator 409, spray indicator 407 is the opposite of no-spray indicator 403 from FIG. 15 which informs the user that spray apparatus 100 is currently ready to fire. Delay indicator 409 informs the user that there will be a delay from when a user presses on covers 123 until the fluid is shot out of nozzles 119. The user of spray apparatus 100 uses communication device 117 to set the duration of the delay on spray apparatus 100. A user may also use communication device 117 at any time to remove or modify this delay.

Figure 17:
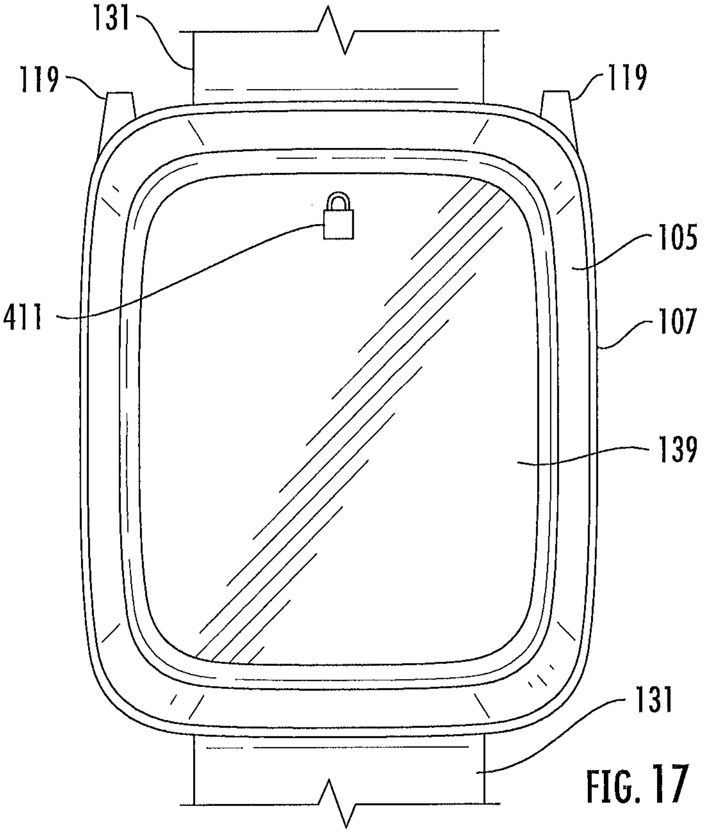
FIG. 17 is a top view of the watch device in defensive spray apparatus as shown in FIG. 1.

Another way that a user can use communication subsystem 117 is to activate a mode where the functionality of spray apparatus 100 is locked. FIG. 17 shows lock indicator 411 which informs the user that apparatus 100 is locked and will not presently function. When lock indicator 411 is on, spray apparatus 100 is in a locked down mode where pressing down on trigger covers 123 will not activate and spray fluids out of nozzles 119. Having a way for an individual to lock the firing mechanism of apparatus 100 prevents individuals from accidently using spray apparatus 100 when the individual did not intend to do so. A user will be able to unlock spray apparatus 100 using communication subsystem 117 when the user is ready to use spray apparatus 100.

Figure 20:
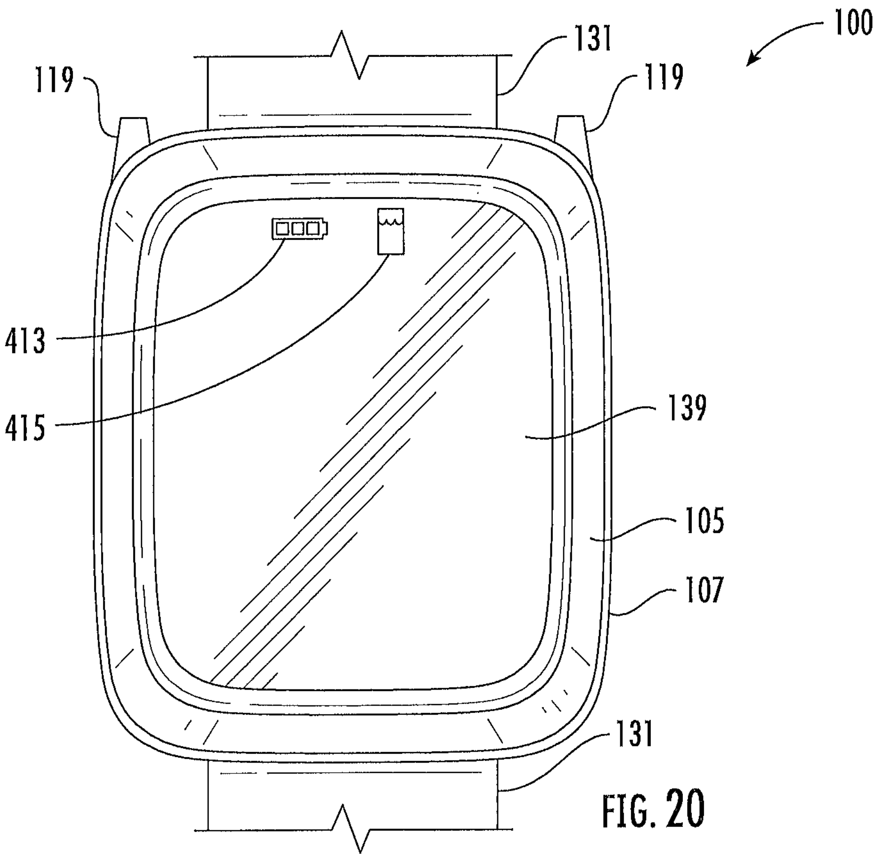
FIG. 20 is a top view of the watch device in defensive spray apparatus as shown in FIG. 1.

FIG. 20 shows another way that communication subsystem 117 connects watch 139 to the rest of defensive spray apparatus 100 by providing a battery indicator 413 and fluid level indicator 415 on the face of watch 139. Battery indicator 413 informs the user of the current charge level of spray apparatus 100 and watch 139 so that the user knows when to charge spray apparatus 100. Fluid level indicator 415 informs a user on how much fluid is presently in canister 109 so the user will know when canister 109 needs to be refilled or replaced. A user can activate or deactivate battery indicator 413 and fluid level indicator 415 using communication subsystem 117. The features described in FIGS. 14-17 and 20 are examples of how communication subsystem 117 can be used to improve the functionality of spray apparatus 100.

Figure 18:
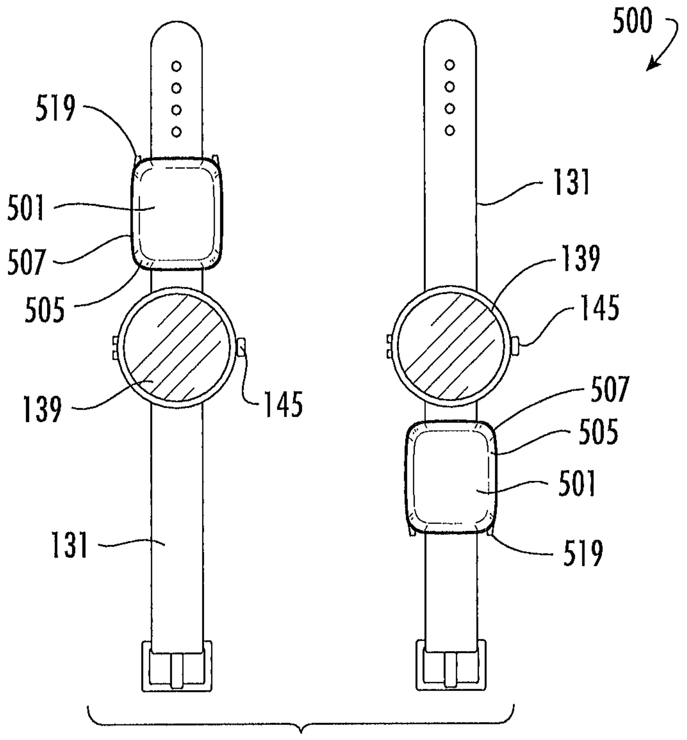
FIG. 18 is a top view of the watch device in an alternative embodiment of defensive spray apparatus.

Referring now to FIG. 18 in the drawings, an alternative embodiment of the present application defensive spray apparatus 500 is depicted. Alternative embodiment of spray apparatus 500 includes watch band 131, watch device 139, and time knob 143 found in defensive spray apparatus 100 while also including casing 501, second casing segment 505, chamfered casing edges 507, and nozzles 519. Spray apparatus 500 fits over watch band 131 instead of watch device 139 being inserted into casing 501. As such, spray apparatus 500 can be placed on any point along watch band 131 and on any watch 139 that would be unable to fit within casing 101 of spray apparatus 100 in the previous embodiment. Since watch device 139 is not stored within casing 501 in this embodiment, casing 501 has a solid top preventing objects from being inserted through the top of apparatus 501. Spray apparatus 500 will be inserted over watch bands 131 through wall openings 533 on the front and back of casing 501. Wall openings 533, while not shown in the current drawing, are located at the same location and structured the same as wall openings 133 in the preferred embodiment of defensive spray apparatus 100. The rest of spray apparatus 500 continues to function the same as spray apparatus 100 in the preferred embodiment.

Figure 19:
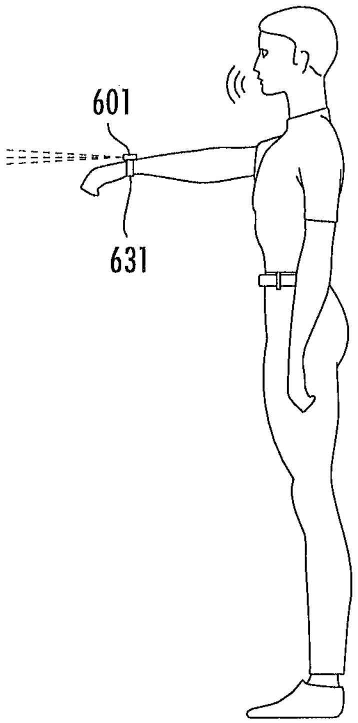
FIG. 19 is a side view of an individual wearing an alternative embodiment of defensive spray apparatus.

Referring now to FIG. 19 in the drawings, an alternative embodiment of present application defensive spray apparatus 600 is depicted. FIG. 19 depicts an alternative way that a user can operate spray apparatus 600 by using the voice of the user to operate apparatus 600. Defensive spray apparatus 600 has the same structure as the preferred embodiment of spray apparatus 100 and has the same functionality of spray apparatus 100. Along with the functionality of spray apparatus 100, a user of spray apparatus 600 can establish a key word or phrase using communication subsystem 617 that will trigger operation of spray apparatus 600 when spoken by the user. By using communication subsystem 617, the user can toggle when the audio phrase will or will not trigger the functionality of spray apparatus 600. When the user speaks the audio phrase, nozzles 619 will be opened and defensive spray will eject from spray apparatus 600.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered, modified and/or combined, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

The invention claimed is:

1. A defensive spray apparatus, comprising:

a personal electronic device;

a casing configured to receive and hold the electronic device; and a canister carried at least partially by the casing;

wherein the defensive spray apparatus is configured to be worn by a user; and wherein at least a portion of the casing is formed by a flexible material.

2. The defensive spray apparatus of claim 1, wherein the casing comprises:

a first casing segment; and a second casing segment forming the portion of the casing formed by the flexible material coupled to the first casing segment.

3. The defensive spray apparatus of claim 1, wherein the casing comprises:

at least one nozzle.

4. The defensive spray apparatus of claim 1, wherein the casing comprises:

at least one trigger.

5. The defensive spray apparatus of claim 4, wherein the casing comprises:

at least one trigger cover.

6. The defensive spray apparatus of claim 4, further comprising:

at least two triggers;

wherein the defensive spray apparatus will not function, unless the at least two triggers are pressed simultaneously.

7. The defensive spray apparatus of claim 1, wherein the casing comprises:

at least one canister release button; and a ledge on an end of the canister release button.

8. The defensive spray apparatus of claim 1, wherein the casing comprises:

a button extension.

9. The defensive spray apparatus of claim 1, wherein the casing comprises:

a communication subsystem.

10. The defensive spray apparatus of claim 9, wherein the communication subsystem is connected to the electronic device by any of the following:

a Bluetooth connection;

a wired connection; and a Wi-fi connection.

11. The defensive spray apparatus of claim 9, wherein the communication subsystem will alert 911 when the defensive spray apparatus is triggered.

12. The defensive spray apparatus of claim 9, wherein the communication subsystem will activate an audible alarm when the defensive spray apparatus is triggered.

13. The defensive spray apparatus of claim 1, wherein the casing and the canister are integrally connected.

14. The defensive spray apparatus of claim 1, wherein the canister comprises:

a recess; and a shoulder.

15. The defensive spray apparatus of claim 1, wherein the canister comprises:

an inner chamber configured to receive and dispense a defensive fluid.

16. The defensive spray apparatus of claim 15, wherein the defensive fluid is at least one of the following:

a pepper spray;

an oleoresin capsicum; and an animal repellant spray.

17. The defensive spray apparatus of claim 1, wherein the personal electronic device comprises any of the following:

a watch;

a mobile phone;

a tablet;

a pager;

a media player; and a portable body camera.

18. The defensive spray apparatus of claim 1, further comprising:

at least one wrist band.

19. The defensive spray apparatus of claim 18, wherein the canister is coupled to the wrist band.

20. The defensive spray apparatus of claim 18; wherein the wrist band is made of an elastic material.

* * * * *